US008608549B2

(12) United States Patent
Kido

(10) Patent No.: US 8,608,549 B2
(45) Date of Patent: Dec. 17, 2013

(54) GAMING MACHINE PROVIDING BET REGION WITH NEW PAYOUT RATE IN ROULETTE GAME

(75) Inventor: Katsuhiro Kido, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 425 days.

(21) Appl. No.: 12/776,662

(22) Filed: May 10, 2010

(65) Prior Publication Data

US 2010/0304844 A1 Dec. 2, 2010

(30) Foreign Application Priority Data

May 28, 2009 (JP) ................................ 2009-129277

(51) Int. Cl.
*A63F 9/24* (2006.01)
*A63F 13/00* (2006.01)

(52) U.S. Cl.
USPC .................... 463/25; 463/16; 463/17; 463/29

(58) Field of Classification Search
USPC ........................................................... 463/17
See application file for complete search history.

(56) References Cited

U.S. PATENT DOCUMENTS

| | | | | |
|---|---|---|---|---|
| 5,540,442 | A * | 7/1996 | Orselli et al. | 463/17 |
| 6,059,659 | A * | 5/2000 | Busch et al. | 463/17 |
| 6,264,200 | B1 * | 7/2001 | Smith | 273/274 |
| 6,890,255 | B2 * | 5/2005 | Jarvis et al. | 463/17 |
| 7,311,305 | B2 | 12/2007 | Matsuno et al. | |
| 7,614,624 | B2 * | 11/2009 | Kling et al. | 273/274 |
| 7,669,850 | B1 * | 3/2010 | Miller | 273/143 R |
| 2006/0094493 | A1 * | 5/2006 | Kido | 463/17 |
| 2008/0051182 | A1 | 2/2008 | Kido | |
| 2008/0058069 | A1 | 3/2008 | Kido | |
| 2008/0081693 | A1 | 4/2008 | Kido | |
| 2010/0062861 | A1 | 3/2010 | Kido | |
| 2010/0148442 | A1 * | 6/2010 | Walker et al. | 273/274 |

OTHER PUBLICATIONS

U.S. Appl. No. 12/777,539, filed May 11, 2010, Kido.

* cited by examiner

*Primary Examiner* — Steven J Hylinski
(74) *Attorney, Agent, or Firm* — Lexyoume IP Meister, PLLC

(57) ABSTRACT

The range of game strategies for a player in a roulette game is broadened by providing a bet region corresponding to a new bet rate. A CPU displays a plurality of bet regions, as well as displays a third bet region corresponding to a third numerical range that is smaller than a first numerical range corresponding to a first bet range among a plurality of bet regions, and that is larger than a second numerical range corresponding to a second bet region among the plurality of bet regions. Next, a bet is accepted for a bet region thus displayed, and in a case where it is determined that an award is to be granted for the bet region thus accepted, payout data corresponding to the bet region is extracted from ROM, and the award according to the payout data thus extracted is granted.

5 Claims, 12 Drawing Sheets

RATE TABLE

| TOTAL NUMBER OF BET BOXES | RATE |
|---|---|
| ⋮ | ⋮ |
| 12 | 3 |
| 9 | 4 |
| 6 | 6 |
| ⋮ | ⋮ |

GAME HISTORY TABLE

| | RATE | | | |
|---|---|---|---|---|
| PLAYER ID | 1 GAME PREVIOUS | 2 GAMES PREVIOUS | ... | 50 GAMES PREVIOUS |
| A1 | 6 TIMES | 9 TIMES | ... | 6 TIMES |
| A2 | 2 TIMES | 3 TIMES | ... | 3 TIMES |
| ⋮ | ⋮ | ⋮ | ⋮ | ⋮ |

BET-SCREEN SELECTION SCREEN

GAMING MACHINE PROVIDING BET REGION WITH NEW PAYOUT RATE IN ROULETTE GAME

CROSS REFERENCE TO RELATED APPLICATIONS

This application is based on and claims the benefit of priority from Japanese Patent Application No. 2009-129277, filed on 28 May 2009, the content of which is incorporated herein by reference.

BACKGROUND OF THE INVENTION

1. Field of the Invention

The present invention relates to a gaming machine providing a bet region with a new payout rate in a roulette game.

2. Related Art

Conventionally, a variety of table games has been known. For example, in a roulette game, firstly, a player places a chip on one or more bet regions among a plurality of bet regions. Then, a dealer starts rotating a roulette wheel and drops a ball in an outer side of a circumference of a roulette wheel. Then, the ball rolls along the circumference of the roulette wheel and subsequently drops in a pocket among a plurality of pockets provided on the circumference of the roulette wheel. Identification numbers from “0” to “36” are assigned to each of the plurality of pockets and, in a case in which a bet region on which a chip is placed corresponds to the identification number assigned to the pocket in which a ball drops, a player can win an award.

Among roulette games, for example, as disclosed in U.S. Pat. No. 7,311,305, a roulette game has been known in which a display for displaying an image is used so as to artificially perform an operation of placing a chip on a bet region.

SUMMARY OF THE INVENTION

However, although the bet regions are plural, the variation among bet regions in a roulette game is constant, and since the variation of payout rates corresponding to the bet regions is also constant, the range of game strategies for a player have been limited.

The present invention has an object of providing a bet region with a new payout rate in a roulette game in order to broaden the range of game strategies for a player.

According to a first aspect, a gaming machine includes: a display that displays an image; memory in which payout data corresponding to all bet regions is stored in advance, payout data corresponding to a third bet region, having a payout amount that is larger than a payout amount corresponding to a first bet region and smaller than a payout amount corresponding to a second bet region, is stored in the memory; and a controller that executes processing of:

(a) displaying a plurality of bet regions, and displaying the third bet region corresponding to a third numerical range that is smaller than a first numerical range corresponding to the first bet region among the plurality of bet regions, and is larger than a second numerical range corresponding to the second bet region among the plurality of bet regions, in addition to the plurality of bet regions, (b) accepting a bet on a bet region displayed in the processing of (a), (c) extracting payout data corresponding to a bet region from the memory in a case where it is determined that an award is granted to the bet region thus accepted in the processing of (b), and (d) granting an award according to the payout data thus extracted.

According to the first aspect of the invention, in addition to a normal bet region, a third bet region is displayed that corresponds to a payout amount larger than the payout amount corresponding to the first bet region and smaller than the payout amount corresponding to the second region.

Therefore, it is possible to broaden the range of game strategies for players by allowing bets to be placed on the new bet region corresponding to a new payout amount.

According to a second aspect, in the gaming machine as described in the first aspect, play history data of each player is stored in the memory, and the controller determines in the processing of (a) whether to display the third bet region according to the play history data.

According to the second aspect of the invention, since it is determined whether to display the third bet region based on the play history of each player, it is possible to display the new bet region by also considering habits of a player.

According to a third aspect, the gaming machine as described in the second aspect further includes: an insertion opening for inserting an authentication card on which a player ID for identifying a player is stored, in which the controller reads the player ID from the authentication card thus inserted into the insertion opening, and determines in the processing of (a) whether to display the third bet region according to the play history data in response to the player ID thus read.

According to the third aspect of the invention, the labor of inputting a player ID can be reduced since a player ID can be identified from data stored in the authentication card, and since it becomes unnecessary for the player to input the player ID.

According to the present invention, the range of game strategies for a player in a roulette game is broadened by providing a bet region corresponding to a new bet rate.

DETAILED DESCRIPTION OF THE INVENTION

Embodiments of the present invention will be described below with reference to the accompanying drawings.

Figure 1:
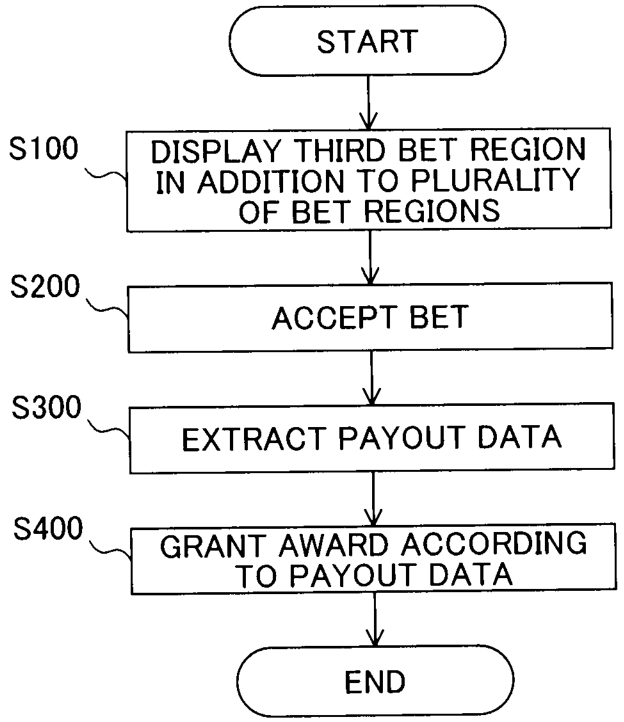
FIG. 1 is a flowchart schematically showing roulette game processing executed in a gaming machine according to an embodiment of the present invention.

Although described later in detail, a CPU 106 displays a plurality of bet regions, as well as displays a third bet region 81 corresponding to a third numerical range that is smaller than a first numerical range corresponding to a first bet region among the plurality of bet regions, and that is larger than a second numerical range corresponding to a second bet region among the plurality of bet regions, in addition to the plurality of bet regions, as shown in FIG. 1 (Step S100). Next, the CPU 106 accepts a bet on a bet region displayed in the processing of Step S100 (Step S200). Then, the CPU 106 extracts payout data corresponding to a bet region from ROM 108, in a case where it is determined that an award is granted to the bet region thus accepted in the processing of Step S200 (Step S300). Next, the CPU 106 grants an award according to the payout data thus extracted in the processing of Step S300 (Step S400).

Figure 2:
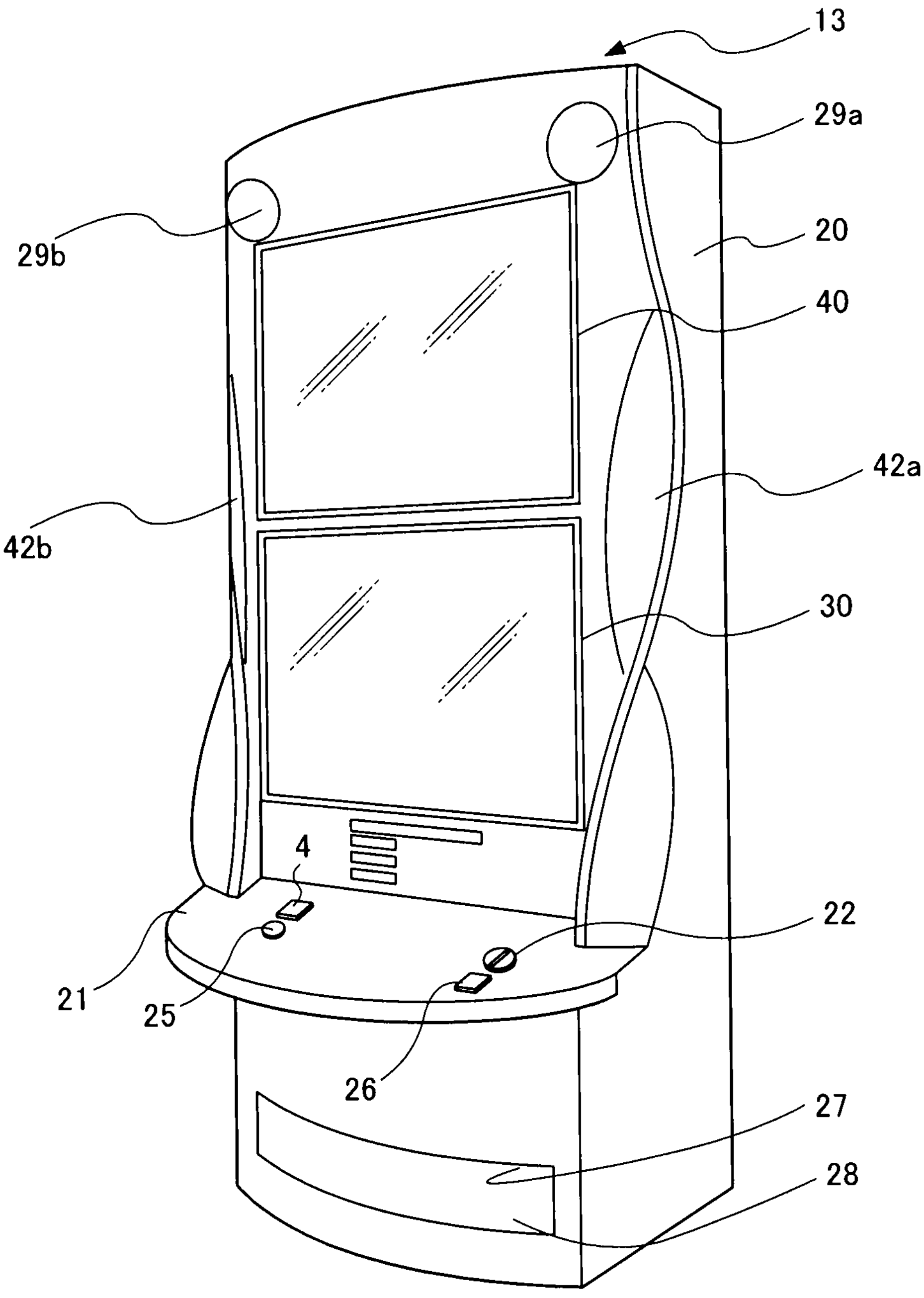
FIG. 2 is a perspective view showing a gaming machine according to the embodiment of the present invention.

FIG. 2 is a perspective view showing the gaming machine 13 according to an embodiment of the present invention. The gaming machine 13 includes a cabinet 20. The cabinet 20 has a structure in which the face facing the player is open. The cabinet 20 houses various components including a controller 100 (refer to FIG. 3) for electrically controlling the slot machine 13, and a hopper 44 (refer to FIG. 8) for controlling the insertion, storage, and payout of coins (game media), and the like. The game medium is not restricted to coins. In addition, examples of such game media include medals, tokens, electronic money or electronic value information (credit) having the same value.

The liquid crystal display 30 is installed substantially in the middle of the front face of the cabinet 20, and the liquid crystal display 40 is installed in upper side of the cabinet 20.

The liquid crystal display 30 realizes a display device for displaying a variety of images related to the game, including rendered images and the like. Such a configuration allows the player to advance the game while visually confirming various kinds of images displayed on the aforementioned liquid crystal display 30.

The other liquid crystal display 40 above the liquid crystal display 30 serves as a sub display for displaying the rules of the game, demonstration screens, and the like.

Furthermore, sound transmission openings 29*a* and 29*b* are provided to both upper left and right sides of the liquid crystal display 40. Here, the sound transmission openings 29 are provided for transmitting sound effects generated by a speaker 41 (see FIG. 3) stored within the cabinet 20. The sound transmission openings 29*a* and 29*b* generate sound effects and the like in accordance with the progress of the game. Decorative lamps 42*a* and 42*b* are disposed at substantially the center on both right and left sides of the gaming machine 13, respectively. The decorative lamps 42*a* and 42*b* emit light in accordance with the progress of the game.

The gaming machine 13 includes a substantially horizontal operation unit 21 below the liquid crystal display 30. Disposed on the right side of the operation unit 21 is a coin slot 22 through which coins are inserted into the gaming machine 13. On the other hand, a start switch 25 that accepts a player's operation for starting a game for each game is disposed on the left side of the operation portion 21. A pushing operation on the start switch 25 triggers the start of a game, and causes the roulette game to start.

Furthermore, a cash-out switch 26 is provided near the coin insertion opening 22. Upon the player pushing the cash out switch 26, the inserted coins are paid out from a coin payout opening 27 provided at a lower portion of the front face. The coins thus paid out are retained in a coin tray 28.

Figure 3:
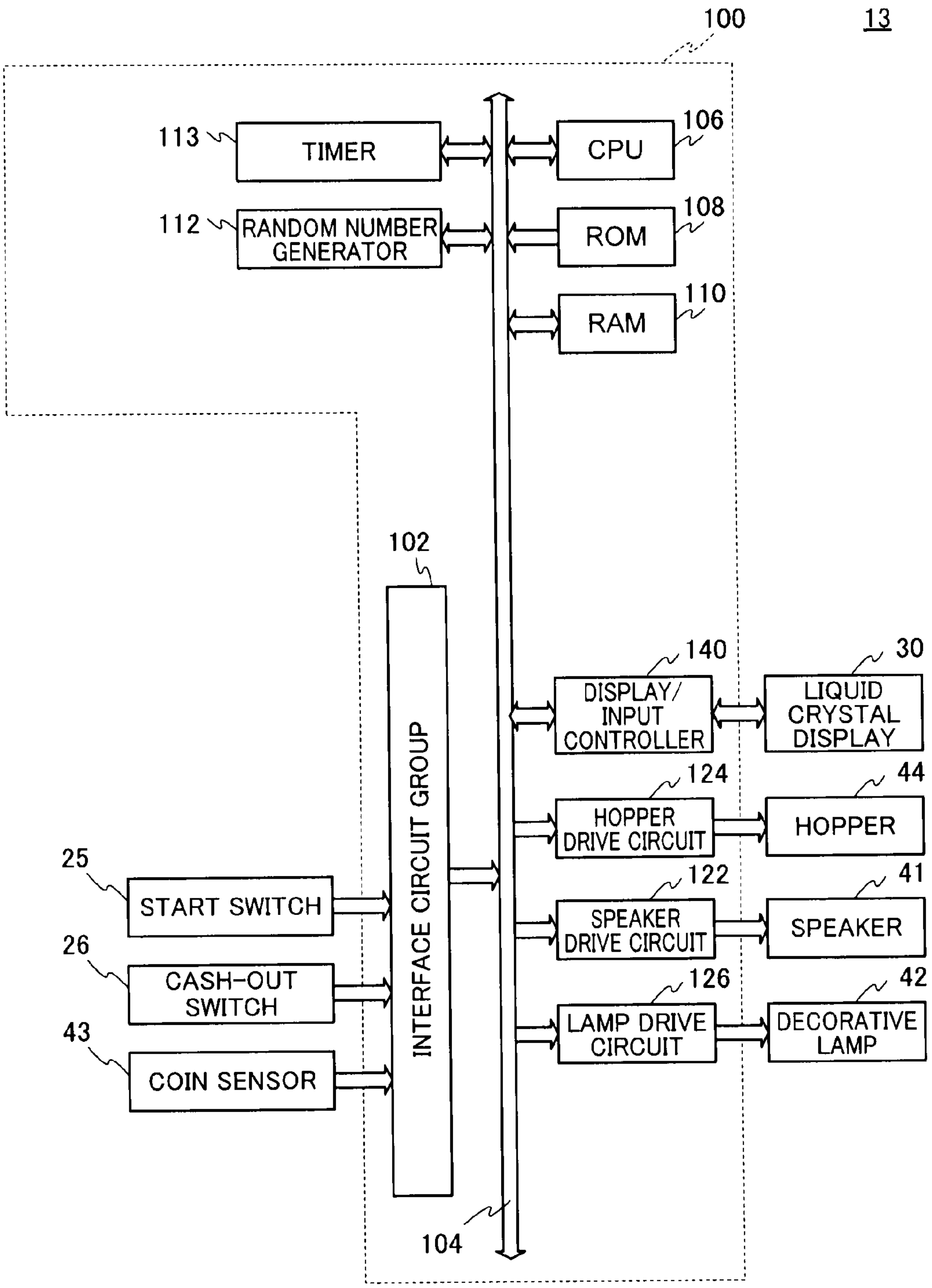
FIG. 3 is a block diagram showing an internal configuration of the gaming machine in FIG. 2.

FIG. 3 is a block diagram illustrating the electrical configuration of the game controller 100 of the gaming machine 13. As shown in FIG. 3, the game controller 100 of the gaming machine 13 is a microcomputer including an interface circuit group 102, an input-output bus 104, a CPU 106, ROM 108, RAM 110, a random number generator 112, a speaker drive circuit 122, a hopper drive circuit 124, a lamp drive circuit 126, and a display/input controller 140.

The interface circuit group 102 is electrically connected with the input/output bus 104, which carries out input and output of data signals or address signals for CPU 106.

The start switch 25 is electrically connected with the interface circuit group 102. In the interface circuit group 102, a start signal generated by the start switch 25 is converted into a predetermined form of signal to be supplied to the input/output bus 104.

The cash-out switch 26 is electrically connected with the interface circuit group 102. The switching signals output from this cash-out switch 26 is also supplied to the interface circuit group 102, and is converted into a predetermined signal by the interface circuit group 102. The switching signals thus converted are supplied to the input/output bus 104.

A coin sensor 43 is also electrically connected with the interface circuit group 102. The coin sensor 43 detects coins inserted into the coin insertion slot 22, and is disposed at an appropriate position relative to the coin insertion slot 22. The sensing signal output from the coin sensor 43 is also supplied to the interface circuit group 102, and is converted into a predetermined signal by the interface circuit group 102. The sensing signal thus converted is supplied to the input/output bus 104.

The CPU 106, the ROM 108, and the RAM 110 are connected to the input-output bus 104.

Upon acceptance of the start operation of a game through the start switch 25, the CPU 106 reads a game program to execute the game. The game program displays a bet screen (described later in FIGS. 6, 9, and 10) on the liquid crystal display 30 through the display/input controller 140 and allows the player to designate a bet region and bet number. Upon completing the designation, an image of a roulette wheel rotating is displayed on the liquid crystal display 30.

The ROM 108 stores a control program for comprehensively controlling the gaming machine 13 (described later in FIG. 5), a program for executing routines shown in FIGS. 7 and 11 (hereinafter referred to as a "routine execution program"), and initialization data for executing the control program, and various data tables used in decision processes. The RAM 110 temporarily stores flags, variables, etc., used for the aforementioned control program.

The random number generator 112 for generating a random number is connected to the input/output bus 104. The random number generator 112 generates random numbers in a predetermined range of "0" to "65535" (the sixteenth power of two minus one), for example. Alternatively, an arrangement may be made in which the CPU 106 generates a random number by computation.

The timer 113 is also connected to the input/output bus 104. The timer 113 measures the amount of time after starting acceptance of a bet. More specifically, the timer 113 measures an elapsed time after the CPU 106 displays a bet screen on the liquid crystal display 30. In the present embodiment, the CPU 106 ends accepting a bet when 30 seconds lapse after displaying a bet screen, and displays an image of a roulette wheel rotating on the liquid crystal display 30.

The speaker drive circuit 122 for the speakers 41 is also electrically connected with the input/output bus 104. The CPU 106 reads the sound data stored in the ROM 108, and transmits the sound data thus read to the speaker drive circuit 122 via the input/output bus 104. In this way, the speakers 41 generate predetermined sound effects.

The hopper drive circuit 124 for driving the hopper 44 is also electrically connected with the input/output bus 104. Upon reception of a cash out signal input from the cash out switch 26, the CPU 106 transmits a driving signal to the hopper drive circuit 124 via the input/output bus 104. Accordingly, the hopper 44 pays out coins such that the amount thereof is equivalent to the current number of coins remaining as credits, which is stored in a predetermined memory area of the RAM 110.

Alternatively, the payout of the coins may be performed in the form of credit data stored in a data card or the like, instead of using physical coins. That is, the player may carry a card functioning as a recording medium, and store the data related to the credit by inserting the card into the gaming machine 13.

The lamp drive circuit 126 for driving the decorative lamps 42*a* and 42*b* is also connected with the input/output bus 104. The CPU 106 transmits the signal for driving the lamps according to the predetermined conditions based on the program stored in the ROM 108 to the lamp drive circuit 126. Thus, decorative lamps 42*a* and 42*b* blink and the like.

The display/input controller 140 is also connected to the input/output bus 104. The CPU 106 creates an image display command corresponding to the state and results of the game, and outputs the image display command thus created to the display/input controller 140 via the input/output bus 104. Upon reception of the image display command input from the CPU 106, the display/input controller 140 creates a driving signal for driving the liquid crystal display 30 according to the image display command thus input, and outputs the driving signal thus created to the liquid crystal display 30. As a result, a predetermined image is displayed on the liquid crystal display 30. The display/input controller 140 transmits the signal input through the touch panel 32 provided on the liquid crystal display 30 to the CPU 106 via the input/output bus 104 in the form of an input signal.

Figure 4:
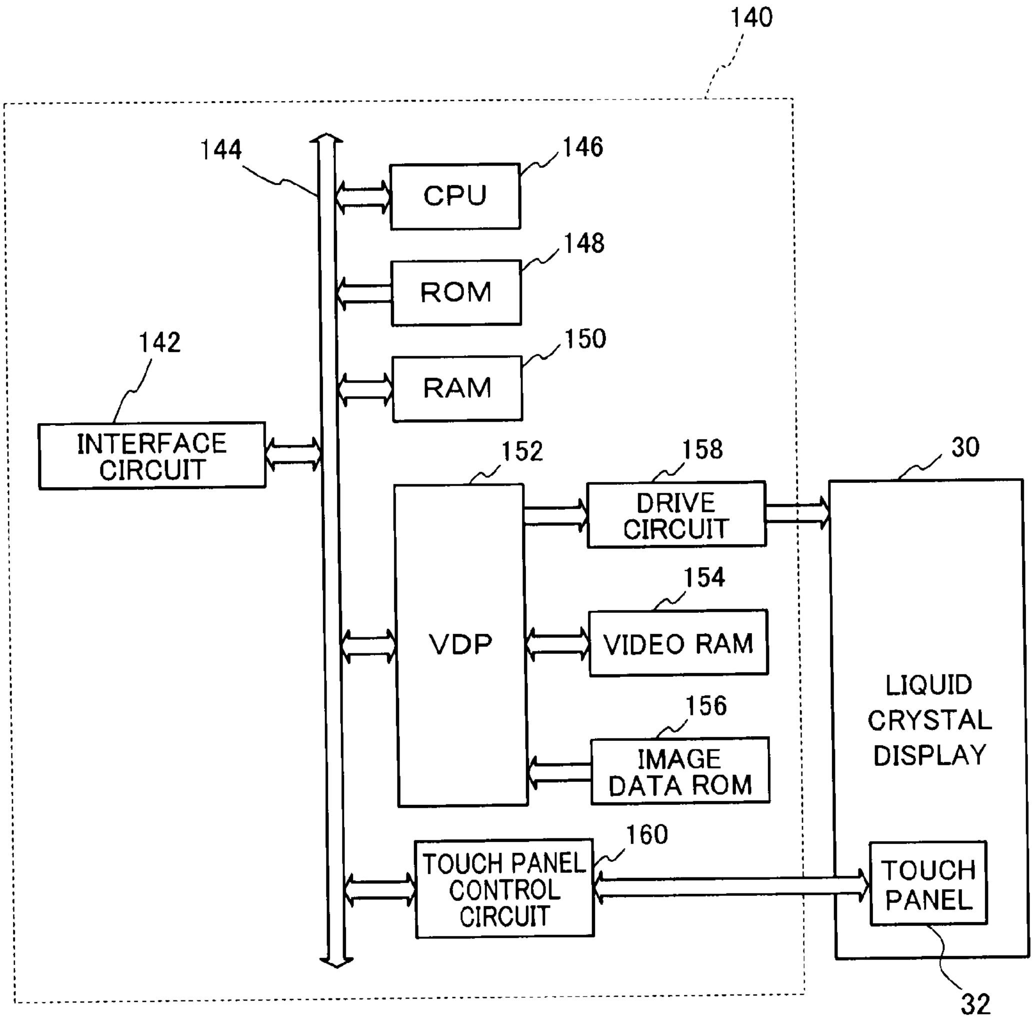
FIG. 4 is a block diagram showing an internal configuration of a display/input controller in the gaming machine shown in FIG. 2.

FIG. 4 is a block diagram illustrating an electrical configuration of the display/input controller 140 of the gaming machine 13. The display/input controller 140 of the gaming machine 13 is a sub-microcomputer for performing image display processing and input control for the touch panel 32. The display/input controller 140 includes an interface circuit 142, an input/output bus 144, a CPU 146, ROM 148, RAM 150, a VDP 152, video RAM 154, image data ROM 156, a drive circuit 158, and a touch panel control circuit 160.

The interface circuit 142 is connected to the input/output bus 144. An image display instruction output from the CPU 106 on the abovementioned game controller 100 is supplied to the input/output bus 144 via the interface circuit 142. The input/output bus 144 performs input/output of data signals or address signals to and from the CPU 146.

The ROM 148 and the RAM 150 are connected to the input/output bus 144. The ROM 148 stores a display control program for generating a drive signal, which is to be supplied to the liquid crystal display 30, according to an image display instruction received from the CPU 106 of the aforementioned game controller 100. On the other hand, the RAM 150 stores flags and variables used in the aforementioned display control program.

The VDP 152 is connected to the input/output bus 144. The VDP 152 includes a so-called sprite circuit, a screen circuit, a palette circuit, etc., and can perform various kinds of processing for displaying images on the liquid crystal display 30. The video RAM 154 and the image data ROM 156 are connected to the VDP 152. The video RAM 154 stores image data based on the image display instructions from the CPU 106 on the game controller 100. The image data ROM 156 stores various kinds of image data including the abovementioned effect image data and the like. Furthermore, the drive circuit 158 for outputting a drive signal for driving the liquid crystal display 30 is connected to the VDP 152.

By reading and executing the display control program stored in the ROM 148, the CPU 146 instructs the video RAM 154 to store image data to be displayed on the liquid crystal display 30 in response to the image display instruction from the CPU 106 on the abovementioned game controller 100. Examples of the image display commands include various kinds of image display commands including the aforementioned image display commands for visual effects, etc.

The image data ROM 156 stores various kinds of image data including the aforementioned image data for visual effects, etc.

The touch panel control circuit 160 transmits the signals input via the touch panel 32 provided on the liquid crystal display 30 to the CPU 106 via the input/output bus 144 in the form of an input signal.

Figure 5:
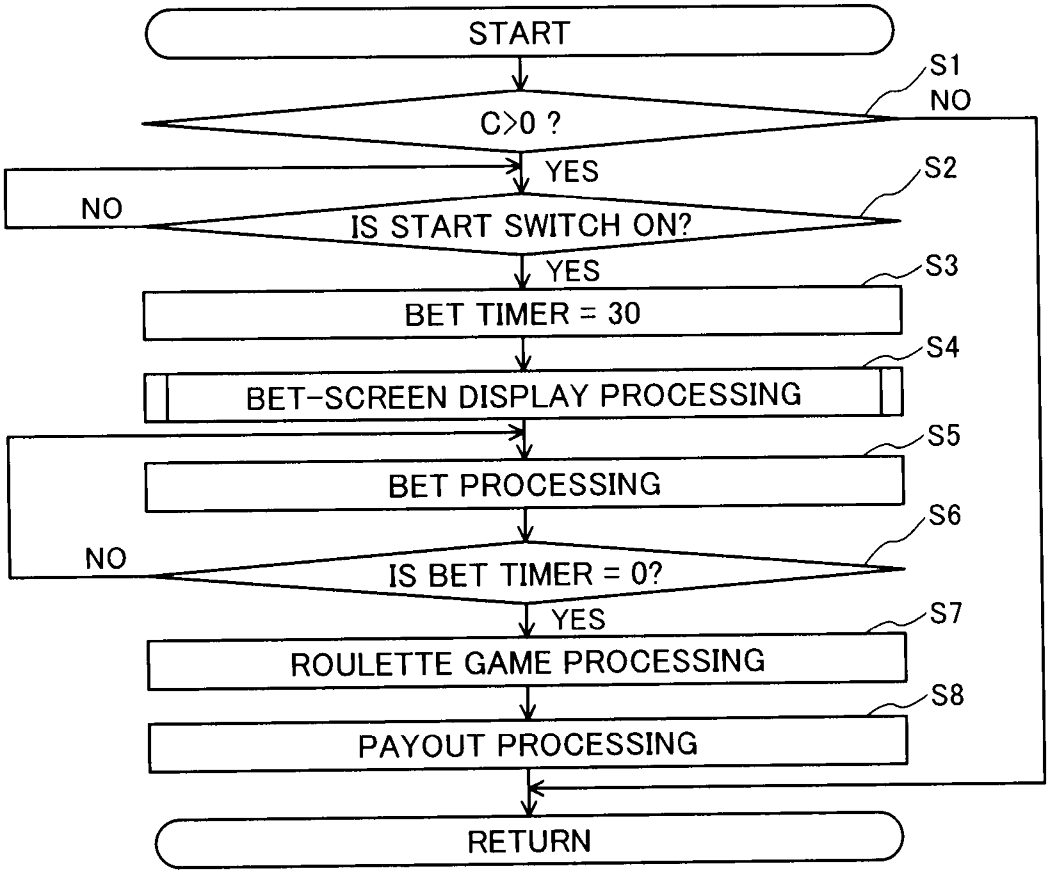
FIG. 5 is a flowchart of roulette game processing according to the embodiment of the present invention.

FIG. 5 is a flowchart showing a flow of roulette game processing in the gaming machine 13 executed by the game controller 100 of the gaming machine 13. The processing operation is called from a main program for the slot machine 13 at a predetermined timing, and then executed.

In the following, it is supposed that the gaming machine 13 is activated in advance and the variables used in the CPU 106 on the game controller 100 are initialized to predetermined values, thereby providing a stationary action of the gaming machine 13.

First, the CPU 106 on the game controller 100 side determines whether there remains a certain credit being the number of remaining coins inserted by the player (Step S1). More specifically, CPU 106 reads the amount of credits C stored in the RAM 110, and executes processing according to the amount of credits C. When the amount of credits C equals "0" (NO in Step S1), the CPU 106 terminates the routine without executing any processing, since it cannot start a game. When the amount of credits C is not less than "1" (YES in Step S1), the CPU 106 determines that coins remain as credits, and the CPU 106 moves the processing to Step S2.

In Step S2, the CPU 106 determines whether the start switch 25 is ON, and then, waits for the start switch 35 to be operated. Upon the start switch 25 being operated, and accordingly, upon the operation signal being input from the start switch 25 (in a case of "YES" in the determination processing in Step S2), the CPU 106 determines that the start switch 25 has been operated, and the flow proceeds to Step S5.

In Step S3, the CPU 106 sets the bet time to "30" by setting the timer 113 to "30". The timer 113 is decremented by "1" with each elapse of 1 second.

In Step S4, the CPU 106 performs bet-screen display processing, which is described later with FIGS. 7 and 11. In Step S5, the CPU 106 performs bet processing. In bet processing, it is determined which bet region a bet has been placed by receiving, from a touch panel 32 provided on the liquid crystal display 30, position data of a bet region touched by a player.

In Step S6, the CPU 106 determines whether the bet time is "0" or not by determining whether the timer 113 is "0" or not. Along with this, in a case where it has been determined that the bet time is "0" (in a case of a YES determination in the processing of Step S6), the CPU 106 performs roulette game processing (Step S7), performs payout processing (Step S8), and ends the present routine. On the other hand, in a case in which the CPU 106 determines that the bet time is "0" (in a case of a YES determination in the processing of Step S6), the CPU 106 returns the processing to Step S5.

In addition, in the payout processing of Step S8, the CPU 106 determines a payout amount by referring to a rate table described later with FIG. 8, and grants an award according to the payout amount thus determined.

A bet screen according to an embodiment of the present invention will be explained with reference to FIG. 6.

Figure 6:
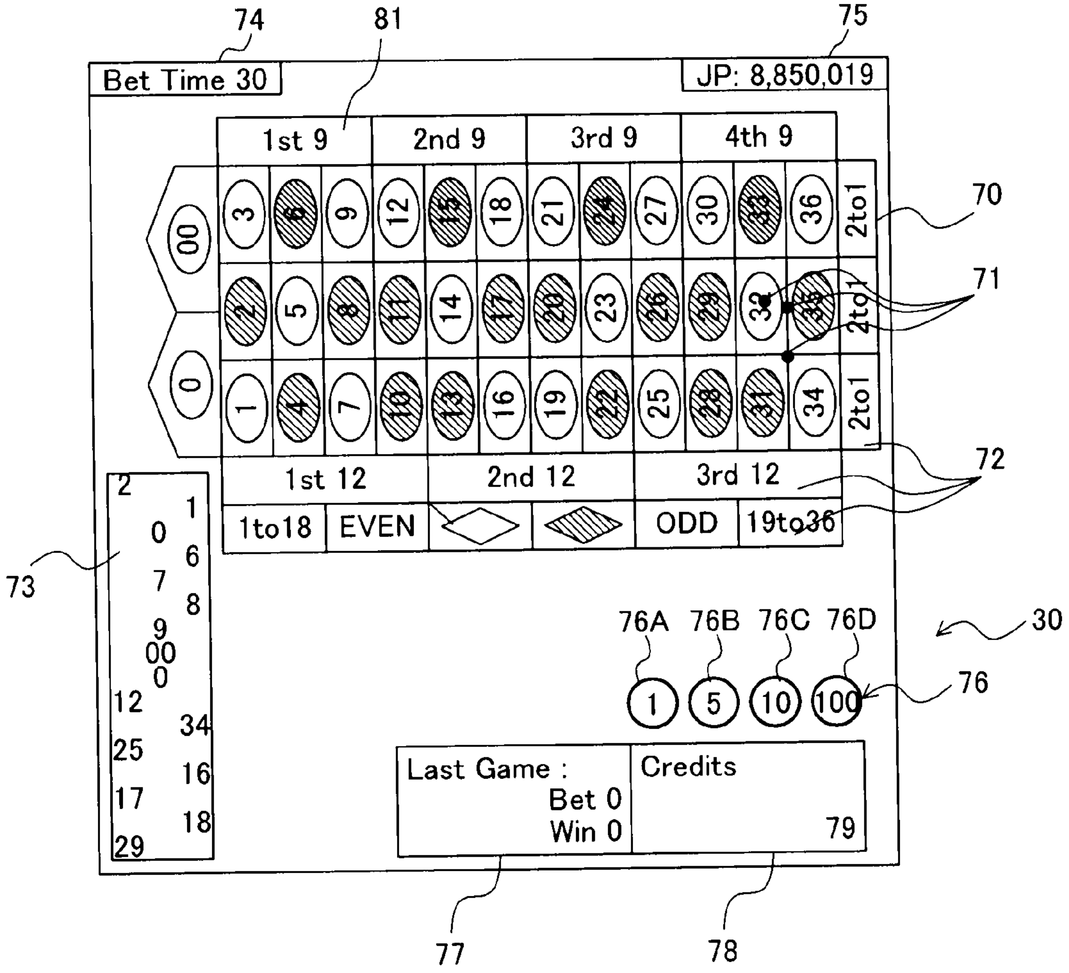
FIG. 6 is a view showing an example of a bet screen displayed in a gaming machine according to an embodiment of the present invention.

FIG. 6 is an enlarged view of a display region in the liquid crystal display 30 of the gaming machine 13. In the liquid crystal display 30, a betting board 70 is displayed. A plurality of bet regions 71 for betting credits is displayed on the betting board 70. In the bet regions 71, 38 numerals of "0", "00", and "1" through "36" are aligned and displayed in boxes.

For example, as shown in FIG. 6, in a case in which a chip is placed on a box "32", betting a chip on a single number "32" is indicated. Such a betting method is called a "Straight-up bet".

Furthermore, in a case in which a chip is placed on a line between boxes "32" and "35", betting a chip on two numbers "32" and "35" is indicated. Such a betting method is called a "Split-bet".

In a case in which a chip is placed at the intersection of the lines between the boxes "31", "32", "34", and "35", betting a chip on four numbers "31", "32", "34", and "35". Such a betting method is called a "Corner-bet".

Furthermore, special BET areas 73, which allow the player to bet on "odd numbers", "even numbers", "the color of the number display plate 64 (red or black)", "a predetermined range of the numbers (e.g., "1" to "12")", are provided in the form of a matrix in the same way.

For example, in a case in which a chip is placed at a box in which "EVEN" is depicted, this indicates that a chip is bet on even number. Such a betting method is called "Even".

Furthermore, in a case in which a chip is placed at a box in which "ODD" is depicted, this indicates that a chip is bet on odd number. Such a betting method is called "Odd".

Furthermore, in a case in which a chip is placed at a box in which red diamond is depicted, betting a chip on boxes with a red color is indicated. Such a betting method is called "Red".

In a case in which a chip is placed in a box in which a black color diamond is depicted, betting a chip so as to cover boxes with a black color is indicated. Such a betting method is called "Black".

In a case in which a chip is placed in a box in which "1st 12", "2nd 12", or "3rd 12" is depicted, betting a chip so as to cover 12 numbers is indicated, respectively. Such a betting method is called a "Dozen Bet".

In a case in which a chip is placed in a box in which "1 to 18" or "19 to 36" is written, betting a chip so as to cover 18 numbers according to whether the number is no more than 18 or at least 19 is indicated. Such a betting method is called "Low/high".

In a case in which a chip is placed in a box in which "2 to 1" is written, betting a chip so as to cover 12 numbers of each column including numbers such as "1", "4", "7" . . . is indicated. Such a betting method is called a "Column bet".

Other bet methods are "Street bet", which places a bet on the end of a horizontal row of number so as to cover 3 numbers (e.g., "13", "14", and "15"); "Five bet", which places a bet on a line between the numbers "00" and "3" so as to cover the five numbers "0", "00", "1", "2", and "3"; and "Line bet", which places a bet between two horizontal rows of numbers so as to cover 6 numbers (e.g., "13", "14", "15", "16", "17", and "18").

The abovementioned betting methods have awarded credits per one chip when a chip bet has won (payout rate) that are respectively different.

Furthermore, as a characteristic of the embodiment according to the present invention, boxes in which "1st 9", "2nd 9", "3rd 9", and "4th 9" is depicted are provided as a new bet region 81. In a case in which a chip is placed in this bet region, betting a chip so as to cover 9 numbers is indicated, respectively.

The payout rate when betting on the new bet region 81, which is to bet to cover these 9 numbers, is 4 times, and is larger than the payout rate (3 times) of a "Dozen bet", which bets to cover 12 numbers, and is smaller than the payout rate (6 times) of a "Line bet", which bets to cover 6 numbers.

A result history display unit 73 is displayed on the left side of the betting board 70. The result history display unit 73 displays the results of the winning numbers of the past games up to the previous game in the form of a list. The term "one game" as used here represents a series of operations from a stage in which the player places a bet in the gaming machine 13, up to a stage in which the player plays a roulette game. With such an arrangement, upon completing one game, a new winning number is added to the top field of the list, which has the capacity to allow the players to confirm the history of the winning numbers for a maximum of 16 games.

A bet time display unit 74 is provided at an upper portion of the betting board 70. The BET time display unit 74 displays the time remaining during which the player can place bets. For example, the BET time display unit 74 displays the time remaining "30" at the time of starting to receive the betting. Then, the time remaining displayed by the BET time display unit 74 is reduced in decrements of 1 for each second. Upon the time remaining becoming zero, the period for receiving bets expires.

Furthermore, a JP (Jack Pot) display unit 75 for displaying the amount of credits accumulated up to the current point in time is provided on the right side of the bet time display unit 74. Here, the JP display unit 75 displays the amount of credits obtained as 0.5% of the accumulated credits up to the previous game. In the case that a predetermined condition has been satisfied in a jackpot bonus game that occurs at a certain timing, the player wins in the jackpot bonus game, and the credit amount for the jackpot is paid out, whereupon the JP display unit 75 displays an initial value (e.g., 50,000 credits) after the payout.

Unit bet buttons 76 are provided at the lower part of the betting board 70. The unit bet buttons 76 are provided for allowing the player to place bets using chips on the bet regions 71 and 72 (a box having a number and mark, or a line which defines the boxes) specified by the player. The unit bet buttons 76 are composed of four kinds of buttons, i.e. a 1 BET button 76A, a 5 BET button 76B, a 10 BET button 76C, and a 100 BET button 76D. A player can bet chips by pushing any one of the unit bet buttons 76 directly such as by a finger, and continuously pushing the unit bet button 76 until a bet region 71 or 72 where the player wants to bet.

The present invention is not restricted to such an arrangement in which the chips are bet on one location. After pushing any one of the unit bet buttons 76, by continuing to push the unit bet button 76 until a bet region 71 or 72 where the player wants to bet, a plurality of bet operations becomes possible.

A payout number display unit 77 is provided at a lower part of the unit bet buttons 76. The payout number display unit 77 displays the amount of chips bet in the previous game and the number of credits paid out. Here, a number obtained by subtracting the amount bet from the number of credits paid out is the number of credits which the player has newly acquired by the previous game. This display example shows a day's first instance of a roulette game in the gaming machine 13, so the amount bet and the payout credits both show "0".

Furthermore, a credit amount display unit 78 is provided at the right side of the payout number display unit 77. A credit amount display unit 78 displays the amount of credits which the player currently has. This credit amount decreases according to a bet amount (one credit for one bet) when chips have been bet. In addition, in a case where a chip bet has won, and a payout of credits is done, a number of credits of a paid out amount is added. It should be noted that, in the event that the number of credits which the player has becomes zero, the game is over. In this display example, "79" is displayed as the credit amount.

Figures 7, 8:
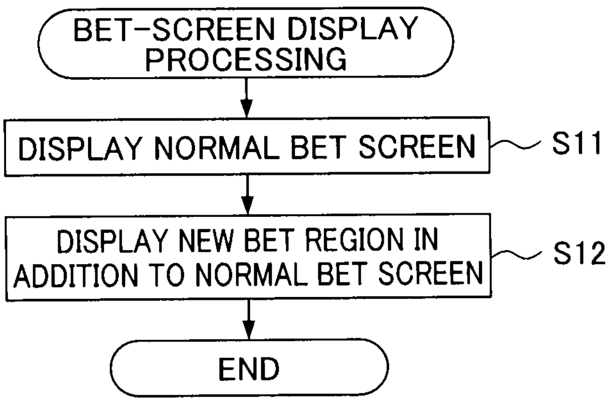
FIG. 7 is a flowchart of bet-screen display processing according to the embodiment of the present invention.
FIG. 8 is a view showing a rate table according to the embodiment of the present invention.

FIG. 7 is a flowchart showing bet-screen display processing.

In Step S11, the CPU 106 displays a normal bet screen. Here, the normal bet screen in FIG. 6 indicates a screen on which boxes in which "1st 9", "2nd 9", "3rd 9", and "4th 9" are not present as the new bet region 81.

As for the display of the normal bet screen, the CPU 106 sends data of a normal bet screen stored in an image data ROM 156 to the liquid crystal display 30 via the display/input controller 140.

In Step S12, the CPU 106 displays the new bet region in addition to the normal bet screen. In other words, in addition to the normal bet screen displayed in Step S11, the new bet region 81 (boxes in which "1st 9", "2nd 9", "3rd 9", and "4th 9" is depicted) is displayed. More specifically, the CPU 106 sends image data of the new bet region 81 stored in the image data ROM 156 to the liquid crystal display 30 via the display/input controller 140.

It should be noted that the processing of Step S11 and Step S12 may be performed simultaneously. In other words, the normal bet screen and a screen including the new bet region 81 may be displayed simultaneously on the liquid crystal display 30.

In addition, the image data of the screen combining the normal bet screen and the new bet region 81 is stored in the image data ROM 156, and the image data thus combined may be sent in the bet-screen display processing to the liquid crystal display 30 in one processing step.

FIG. 8 is a view showing a rate table.

This rate table is a table that is referred to by the CPU 106 in Step S8 of FIG. 5, and the total number of bet boxes (set in each bet region) and the rate are associated and stored. In the present embodiment, a case is explained in which the total number of bet boxes is "12", "9", and "6".

The rate in the case of the total number of bet boxes being "12", that is in the case of bet called a "Dozen bet", as described above, being placed (in the case of bet being placed on boxes in which "1st 12", "2nd 12", and "3rd 12" is depicted), is "3". In addition, the rate in the case of the total number of bet boxes being "6", that is in the case of bet called a "Line bet", as described above, being placed (in the case of bet being to cover 6 numbers (e.g., "13", "14", "15", "16", "17", and "18")), is "6".

In the present embodiment, the rate in the case of a bet being placed on the bet region 81 newly provided (in the case of bet being placed on boxes in which "1st 9", "2nd 9", "3rd 9", and "4th 9" is depicted), is "4".

In this way, variation in betting is increased by newly establishing the bet region 81, which is not present in the bet regions of a normal roulette game. Then, it is possible to broaden game strategies by newly establishing a rate of 4 times among the rates in which 3 times had been followed by 6 times, and associating the new bet region 81 therewith.

The embodiments of the present invention are explained above. Next, a modified example of the roulette game of the present embodiment is explained with reference to FIGS. 9 to 13.

First, a bet screen according to a first modified example of the roulette game is explained with reference to FIGS. 9 and 10.

Figure 9:
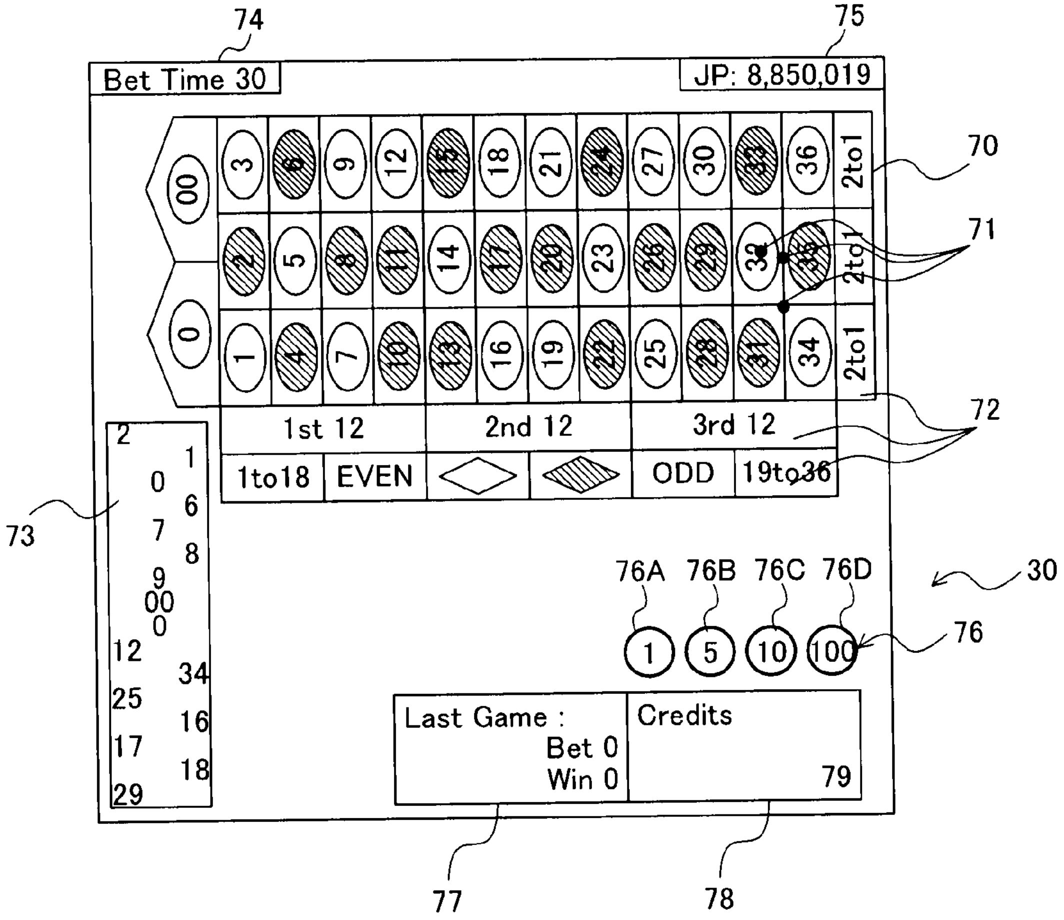
FIG. 9 shows an example of a bet screen displayed on a gaming machine according to a modified example of the present invention.
Figure 10:
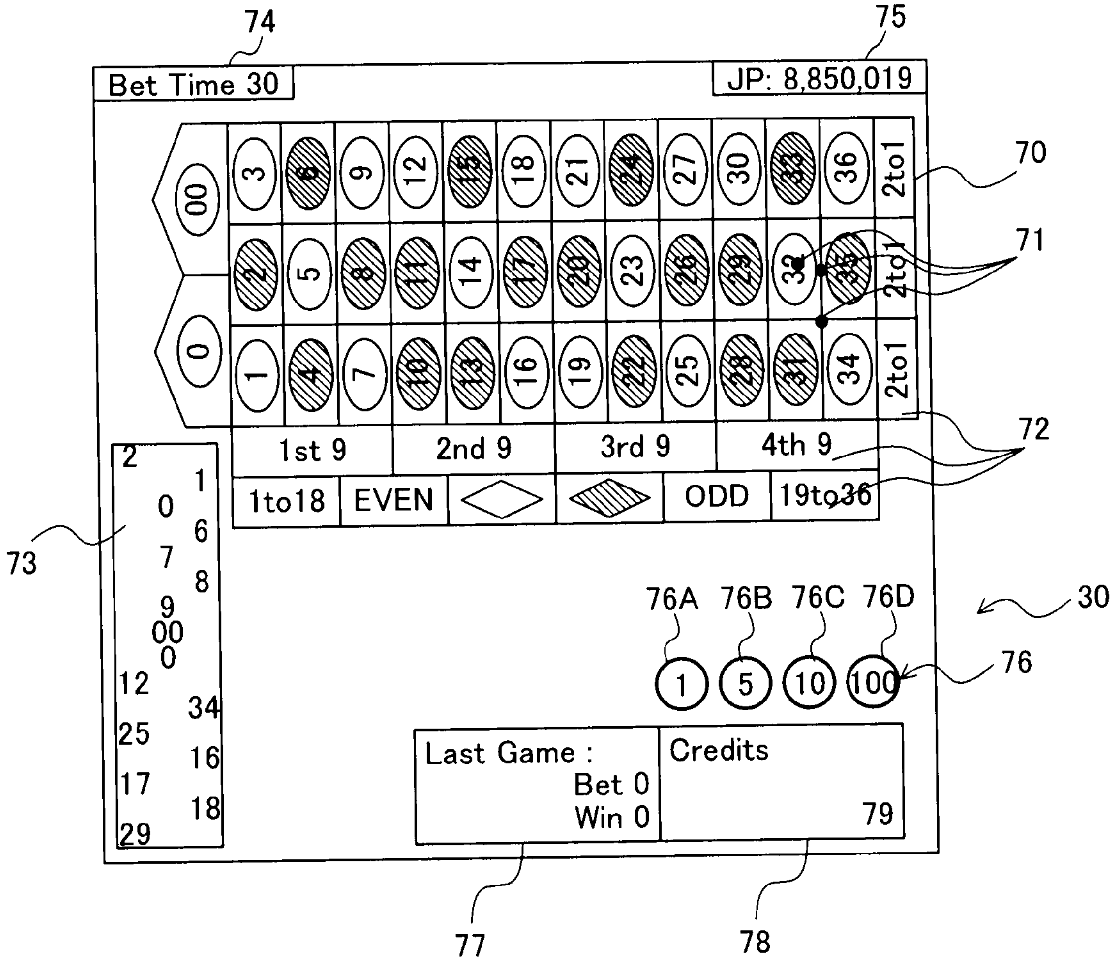
FIG. 10 shows an example of a bet screen displayed on a gaming machine according to a modified example of the present invention.

FIG. 9 is a bet screen of a normal roulette game, and FIG. 10 is a bet screen in which boxes on which "1st 12", "2nd 12", and "3rd 12" is depicted of the bet screen of the normal roulette game are transposed with boxes on which "1st 9", "2nd 9", "3rd 9", and "4th 9" is depicted. In the present first modified example, either of the bet screen of FIG. 9 and the bet screen of FIG. 10 is displayed according to the game history of the player.

Figure 11:
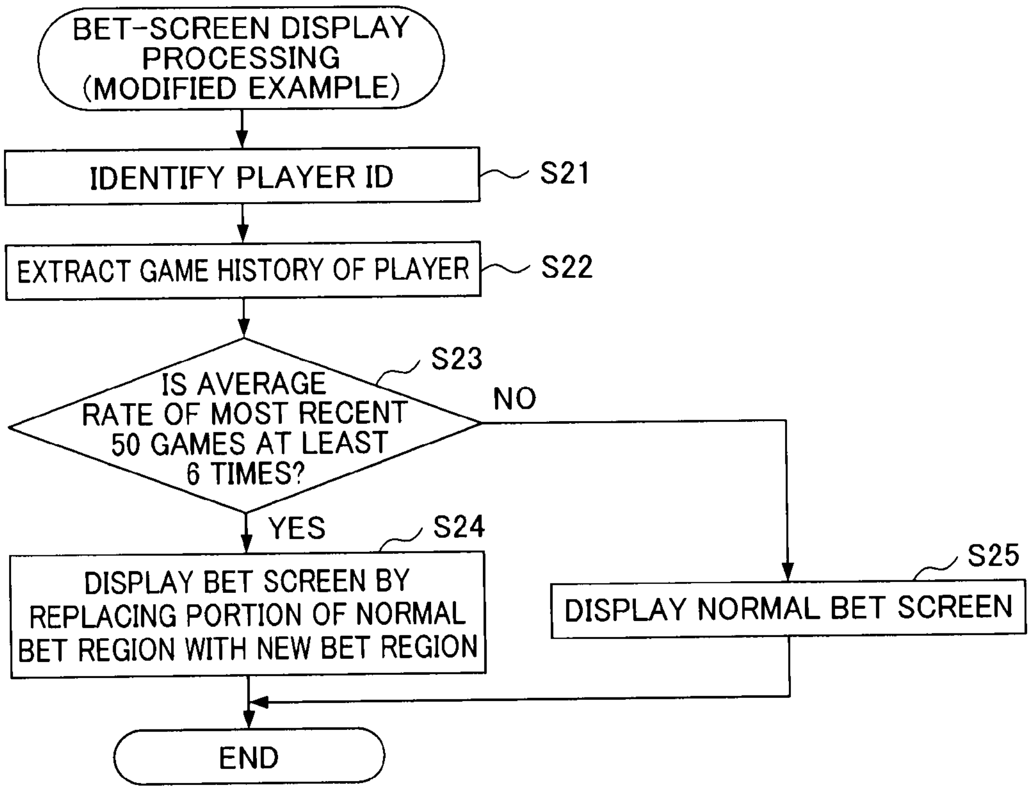
FIG. 11 is a flowchart of bet-screen display processing according to a modified example of the present invention.

FIG. 11 is a flowchart showing bet-screen display processing (modified example). It should be noted that the flowchart of the overall roulette game is similar to the flowchart of FIG. 5.

In Step S21, the CPU 106 identifies a player ID. In an identification method of the player ID, the CPU 106 reads a player ID from a player authentication card inserted into a player authentication card insertion opening (not illustrated) provided to the gaming machine 13, and then stores the player ID in the RAM 110.

In Step S22, the CPU 106 acquires game history of the player. More specifically, game history data stored in each player ID stored in the RAM 110 in Step S21 is acquired by referring to a game history table (described later with FIG. 12) stored in the ROM 108.

Here, the game history table is explained with reference to FIG. 12.

This game history table is a table that is referenced in Step S22 of FIG. 11. According to this table, what rate was bet in each game from a game one previous to a game fifty previous is stored in each player ID. For example, the game history of a player ID "A1" is "6 times" for the game one previous and "9 times" for the game two previous", and so on.

Referring again to FIG. 11, the CPU 106 determines whether the average rate of the fifty most recent games is at least 6 times in Step S23. More specifically, the CPU 106 determines whether the average rate of the fifty most recent games is at least 6 times based on the game history table acquired in Step S22. In the case of this determination being YES, the processing advances to Step S24, and in the case of being NO, the processing advances to Step S25.

In Step S24, the CPU 106 displays a bet screen by changing a portion of a normal bet region to a new bet region. More specifically, the bet screen shown in FIG. 10 is displayed. As for the display of this bet screen, the CPU 106 sends data of the bet screen stored in the image data ROM 156 to the liquid crystal display 30 via the display/input controller 140. When this processing ends, the CPU 106 ends the bet-screen display processing (modified example).

By performing this processing, it is possible to provide a roulette game fitted to a players preference by replacing a bet region of 3 times and displaying a bet region of 4 times for a player that has a tendency to bet at a high rate.

In Step S25, the CPU 106 displays the normal bet screen. More specifically, the bet screen shown in FIG. 9 is displayed. As for the display of this bet screen, the CPU 106 sends data of the bet screen stored in the image data ROM 156 to the liquid crystal display 30 via the display/input controller 140. When this processing ends, the CPU 106 ends bet-screen display processing (modified example).

It should be noted that the bet screen shown in FIG. 6 may be displayed in the processing of Step S24.

Next, a second modified example is explained with reference to FIG. 13.

Although the bet screen displayed on the liquid crystal display 30 was not selectable by a player in the embodiment and first modified example of the present invention, it is made to be selectable in the second modified example.

Figures 12, 13:
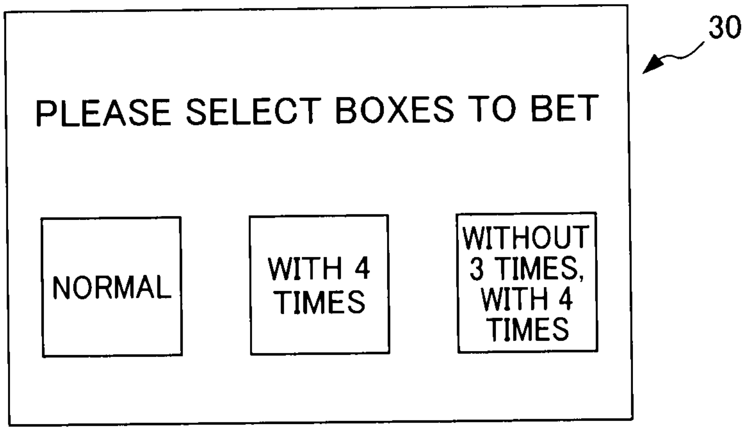
FIG. 12 is a view showing a game history table according to the modified example of the present invention.
FIG. 13 is a view showing a bet-screen selection screen according to a modified example of the present invention.

FIG. 13 is a view showing a bet-screen selection screen.

According to this bet-screen selection screen, three buttons of "normal", "with 4 times", and "without 3 times, with 4 times" are displayed on the liquid crystal display 30. When a player touches "normal", a signal for displaying the normal bet screen shown in FIG. 9 is sent from the touch panel 32 to the game controller 100, and when the CPU 106 detects the signal, the CPU 106 sends image data of the normal bet screen stored in the image data ROM 156 to the liquid crystal display 30 via the display/input controller 140.

In the case of "with 4 times", the bet screen shown in FIG. 6 is displayed on the liquid crystal display 30, and in the case of "without 3 times, with 4 times", the bet screen shown in FIG. 10 is displayed.

Descriptions regarding the first and second modified examples have been provided above. In the first and second modified examples of the present invention, although a roulette game is described as being progressed using a single gaming machine 13, as shown in FIG. 14, a roulette game may be progressed as a mass game using a plurality of the gaming machines 13.

Figure 14:
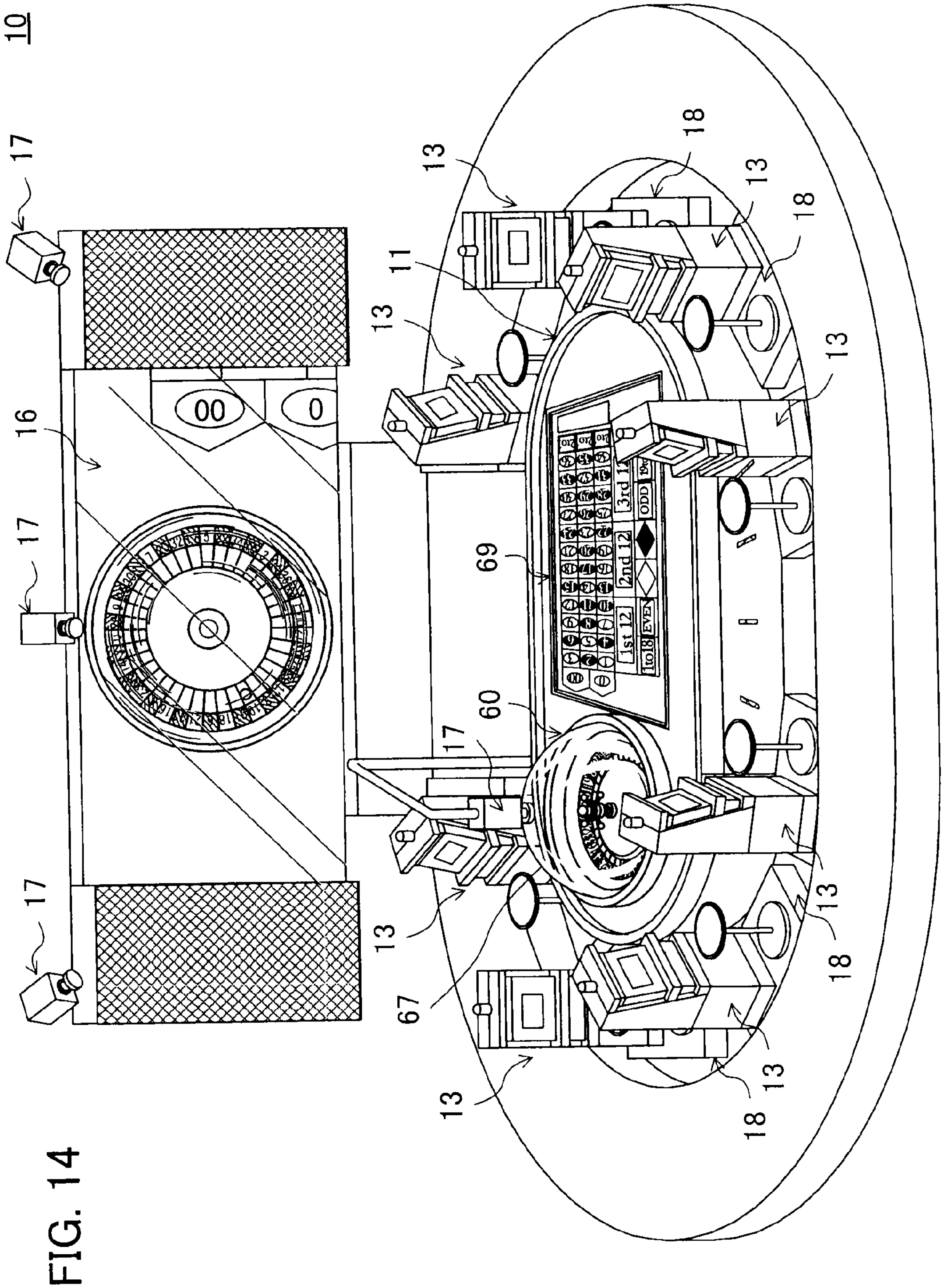
FIG. 14 is a schematic diagram showing an appearance of a gaming system configured to include the gaming machine according to the modified example of the present invention.

A description is provided with respect to FIG. 14. FIG. 14 is a perspective diagram showing an outer appearance of a gaming system 10 using a plurality of the gaming machine 13. As shown in FIG. 14, the gaming system 10 includes a plurality of the gaming machines 13 and a roulette game device 11.

Furthermore, a configuration may be made so that the gaming system 10 includes a large-size monitor 16, and displays contents of the display 69 that displays a large-size betting board indicating a condition of betting of a plurality of players, a bet time indicating a remaining time in which betting is possible, winning numbers, etc. as a progress state of the roulette game on the monitor 16, along with displaying an image of the roulette wheel rotating or a picture of a player captured by the moveable viewpoint camera described later when necessary.

A plurality of the gaming machines 13 (eight gaming machines in the present embodiment) are provided so as to allow players to see the monitor 16. In addition, each gaming machine 13 and a seat thereof for the player is installed on a movable floor 18, and upon a roulette game starting, a gaming machine 13 that has entered the roulette game is configured so as to be raised as one unit with the seat thereof along with raising the movable floor 18.

Furthermore, the gaming system 10 includes multiple movable viewpoint cameras 17 (four in the present embodiment). One of the movable viewpoint cameras 17 is provided for capturing an image of a roulette device 60 described later. Specifically, this movable viewpoint camera 17 captures an image of the rotating roulette wheel, and an image of a ball 65 at a certain position after the roulette wheel stops. The images thus captured are displayed on the monitor 16. The movable viewpoint camera 17 for capturing an image of the roulette device 60 is provided at a position that allows it to capture an image of the roulette device 60 from the viewpoint along the vertical direction from the upper side to the lower side of the roulette device 60. The movable viewpoint camera 17 for capturing an image of the roulette device 60 may capture other images before the rotation of the roulette wheel, e.g., an image of the players or an image of the display 69 for displaying the large-size betting board. The other movable viewpoint cameras 17 are installed on the upper end of the monitor 16, which allows images of the player's expressions to be captured. The images captured by the movable viewpoint cameras 17 are displayed on a liquid crystal display 30 of the gaming machine 13 in addition to the large-size monitor 16.

Although embodiments of the present invention are described above, they are merely exemplified specific examples, and the present invention is not particularly limited thereto. Specific configurations such as each means can be modified appropriately. Moreover, it should be understood that the advantages described in association with the embodiments are merely a listing of most preferred advantages, and that the advantages of the present invention are by no means restricted to those described in connection with the embodiments.

What is claimed is:

1. A gaming machine comprising:
- at least one input device,
- at least one display device configured to display images of a wagering game, including images of a plurality of bet screens, each bet screen comprising a plurality of bet regions,
- at least one memory device configured to store:
  - payout data corresponding to the plurality of bet regions, wherein the payout data comprises a payout amount for a third bet region that is larger than a payout amount corresponding to a first bet region and smaller than a payout amount corresponding to a second bet region, and
  - image data of the plurality of bet screens, wherein image data of a first bet screen does not comprise the third bet region, and image data of a second bet screen comprises the third bet region, and
- a processor that executes processing operations of:
- displaying a bet screen selection screen on the display wherein the bet screen selection screen provides the player the option to select, using the at least one input device, the first bet screen or the second bet screen,
- displaying the selected first or second bet screen,
- receiving a bet from the player on at least one of the bet regions displayed on the selected first or second bet screen,
- extracting payout data corresponding to at least one of the bet regions from the first memory region in a case where it is determined that an award is granted for at least the bet region on which the player bet was received, and
- granting an award according to the payout data thus extracted.

2. The gaming machine according to claim 1, wherein the processing of extracting payout data comprises
- extracting image data corresponding to the bet screen selected by the player, and
- sending the image data to the display device.

3. The gaming machine according to claim 1, wherein the third bet region corresponds to a third numerical range that is smaller than a first numerical range corresponding to the first bet region and is larger than a second numerical range corresponding to the second bet region.

4. The gaming machine according to claim 3, wherein the first bet region corresponds to twelve unit bet regions, the second bet region corresponds to six unit bet regions, and the third bet region corresponds to nine unit bet regions.

5. The gaming machine according to claim 4, wherein the payout data corresponding to the third bet region is four times the bet amount.

* * * * *